United States Patent [19]

Redding et al.

[11] 3,719,265
[45] March 6, 1973

[54] CONVEYOR HANDRAILS
[76] Inventors: Robert Barry Redding; David Aspin Thirlby, both of c/o Fort Dunlop, Erdington, England
[22] Filed: May 12, 1971
[21] Appl. No.: 142,613

[30] Foreign Application Priority Data

May 16, 1970 Great Britain.....................23,813/70

[52] U.S. Cl...................................198/16 R, 198/41
[51] Int. Cl. ..............................................B66b 9/12
[58] Field of Search...................................198/16, 41

[56] References Cited

UNITED STATES PATENTS 3,620,346  12/1969  Brooke et al..........................198/41
3,610,583  10/1971  Ostrom..................................198/41
3,463,290  8/1969  Tajima .................................198/16
2,653,713  9/1953  Siegal....................................198/41

Primary Examiner—Richard E. Aegerter
Attorney—Stevens, Davis, Miller & Mosher

[57] ABSTRACT

A passenger conveyor comprising a C-shaped handrail, which is flexible, contains an embedded longitudinally extending reinforcement and includes a strip of magnetized material; drive means for the handrail; and support means, wherein the drive means has a magnetized rim to attract the handrail and the support means has a magnetized upper edge to repel and support at least part of the weight of the handrail.

1 Claim, 4 Drawing Figures

PATENTED MAR 6 1973                         3,719,265

CONVEYOR HANDRAILS

This invention relates to handrails for passenger conveyors. The conveyors may be of various types, for example, continuous belt, moving platform, or escalators.

Conventional handrails are supported by means of guides over which the handrail slides. The guides may be coated with low friction materials to reduce the driving power required for a given conveyor length and the return run is commonly supported on a series of spaced-apart rollers to reduce friction on the return run but the handrail length which may be satisfactorily driven is still limited.

According to the present invention a passenger conveyor comprises: a flexible handrail, comprising a length of flexible polymeric material and a localized longitudinally-extending magnetized strip of reinforcement material embedded within the length of polymeric material; drive means for the handrail, comprising a drive wheel having a magnetized rim portion; and support means for the belt, comprising a rigid support member having a top edge extending adjacent to the handrail and a strip of magnetized material along the mid-edge whereby the handrail is at least partially supported upon the support member by magnetic repulsion and attracted towards the drive pulley by magnetic attraction.

The invention also provides a conveyor in which the handrail has an embedded strip of magnetized material in the lower surface of the handrail. Another aspect of the invention provides a magnetic release shoe to assist the disconnection of the handrail for the drive pulley.

Other features of the invention will be apparent from the following description of some embodiments of the invention, by way of example only, in conjunction with the accompanying diagrammatic drawings in which.

Figure 1:
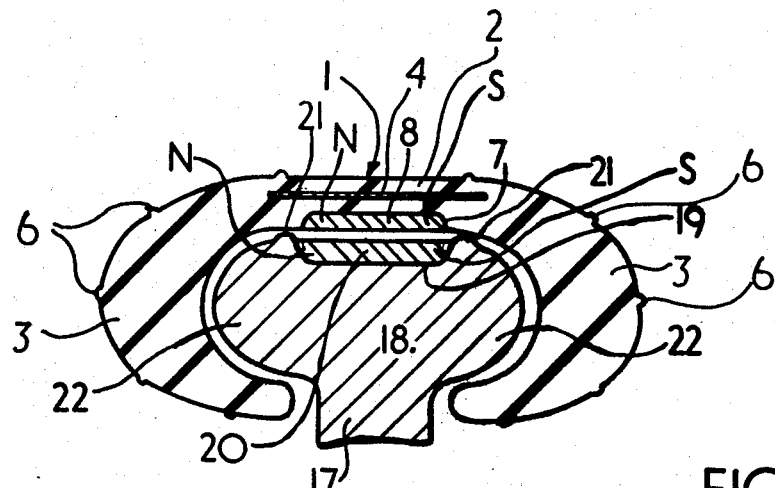
FIG. 1 shows in cross-section a handrail and support means.

The handrail 1 in FIG. 1 comprises a central substantially-flat section 2 having two side regions 3 each of which are curved to give the assembly a C-shaped cross-section. The handrail 1 is made of the material known as "hypalon" and is extruded around a flat steel strip reinforcement 4 which extends along the length of the handrail and forms a longitudinal reinforcement which transmits tensile forces through the handrail. A groove 7 is formed on the inner surface of the C-shaped section which extends longitudinally along the handrail. This groove 7 is filled by a strip 8 of magnetized material comprising about 95 percent barium ferrite particles in a binder of polymeric material such as "hypalon."

This strip 8 may be magnetized N to S across the strip as shown in FIG. 1 or N to S through the thickness of the strip.

The conveyor is supported upon a balustrade 17 having a top section 18 of aluminium. The top section 18 has a cross-section which is of a similar C-shape to the handrail but slightly smaller. Along the top section 18 is machined a groove 19, similar to the groove 7 in the handrail, which is filled by a magnetized strip 20 comprising barium ferrite in "hypalon" as in the case of the handrail. The two strips 8, 20 are polarized in the same sense and thus, when the handrail is mounted over the edge region 18, the strips repel and at least some of the weight of the handrail is supported with a consequent lessening of the frictional drag to the movement of the handrail in a longitudinal direction.

The top edge 18 has provided slightly upstanding rail portions 21 of austenitic stainless steel which work hardens to give a low friction surface at either side of the magnetic strip to provide mechanical support for the handrail to take large applied loads and also the side portions 22 being similar in shape to the conveyor to provide sideways location of the handrail.

Figure 2:
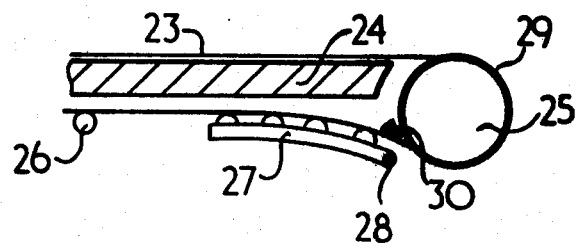
FIG. 2 shows the support and drive means for a form of handrail.

FIG. 2 illustrates a simple drive system for a handrail according to the invention. A handrail 23 is supported on a balustrade 24 by magnetic means as described. A newel wheel 25 drives the handrail by means of frictional contact and the handrail returns supported on a series of pulleys 26 provided at the base of the balustrade. A tension frame 27 pivotally mounted at 28, maintains a preset tension in the handrail which is withstood by the steel strip 4 of the handrail. Curvature over the newel wheel is allowed by bending the strip 4 which is substantially flat. The outer periphery of the newel wheel is provided with a magnetized strip 29 polarized in the opposite sense to the strip 8 in the handrail. When the two strips come into close proximity as the handrail 23 contacts the newel wheel 24 the magnetic attraction increases the mechanical contact force and thus for a given coefficient of friction, a larger driving force may be transmitted.

A generally triangular section release shoe 30 magnetized to repel the handrail is provided adjacent to the periphery of the newel wheel to assist in releasing the handrail 23 prior to its return journey over the pulleys 26.

Figure 3:
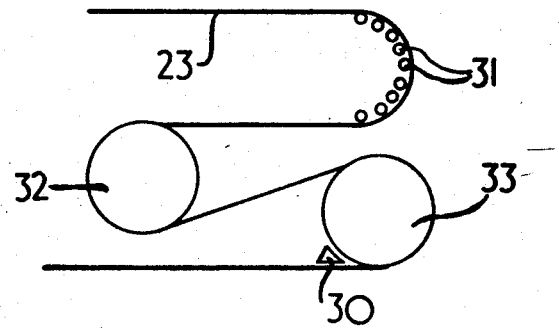
FIGS. 3 and 4 show an alternative drive means for the handrail.

The arrangement shown in FIG. 3 is suitable for a conveyor having a glass balustrade. The handrail 23 passes round a series of rollers 31 placed at the end of the conveyor and then over a tension roller 32 before reaching a magnetized drive pulley 33. The tension roller 32 and drive pulley 33 being placed below the level of the glass balustrade.

Figure 4:
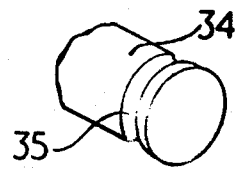

As an alternative to using a separate drive pulley for the handrail with the consequent need to carefully synchronize its peripheral speed with that of the drive pulley for the main conveyor the handrail may take its drive from a groove 35 provided in the end of the drive pulley 34 for the main belt as shown in FIG. 4. In the base of the groove 35 is placed a strip of magnetized material as before.

Other arrangements of drive and tensioning pulleys may be utilized. The handrail is easily bent around such pulleys, and may also be twisted about its longitudinal axis which allows offset pulleys to be used.

The use of magnetic support reduces the frictional resistance to handrail movement and the magnetically assisted drive increases the force which may be applied to the handrail with the result that either a smaller drive motor may be used than hitherto or that a longer single run of handrail may be driven.

Having now described our invention what we claim is:

1. A passenger conveyor comprising: a flexible handrail, having a length of flexible polymeric material and a localized longitudinally extending magnetized strip of reinforcement material embedded within the length of polymeric material; drive means for the handrail, comprising a drive wheel having a magnetized rim portion of opposite polarity to said magnetized reinforcement material so that the handrail is attracted toward the drive pulley by magnetic attraction; a magnetized release shoe of opposite polarity to said magnetized reinforcement adjacent to the rim portion of the drive pulley immediately adjacent to the point at which the handrail ceases contact with said pulley, the release shoe acting to repel the handrail and consequently assist the release of the handrail from the drive pulley; support means for the belt comprising a rigid support member having a top edge extending adjacent to the handrail and a strip of magnetized material of the same polarity as said magnetized reinforcement material along the said edge whereby the handrail is at least partially supported upon the support member by magnetic repulsion.

* * * * *